United States Patent
Asawa et al.

(10) Patent No.: US 7,724,519 B2
(45) Date of Patent: May 25, 2010

(54) INFORMATION PROCESSING APPARATUS

(75) Inventors: Tsutomu Asawa, Nagano (JP); Atsushi Kawase, Tokyo (JP); Chiharu Tanaka, Aichi (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 10/578,367

(22) PCT Filed: Sep. 2, 2005

(86) PCT No.: PCT/JP2005/016136

§ 371 (c)(1),
(2), (4) Date: May 5, 2006

(87) PCT Pub. No.: WO2006/028022

PCT Pub. Date: Mar. 16, 2006

(65) Prior Publication Data

US 2008/0291616 A1    Nov. 27, 2008

(30) Foreign Application Priority Data

Sep. 8, 2004    (JP)    ............................ 2004-261111

(51) Int. Cl.
*G06F 1/16*    (2006.01)

(52) U.S. Cl. .................. 361/679.55; 345/157; 369/264; 400/489; 455/411

(58) Field of Classification Search ................. 345/156, 345/157; 369/264; 400/489; 455/411; 320/101; 361/679.02, 679.11, 679.23, 679.27, 679.28, 361/679.45, 679.58

See application file for complete search history.

(56) References Cited

U.S. PATENT DOCUMENTS

2004/0164955 A1* 8/2004 Miyashita et al. ........... 345/156
2008/0291616 A1* 11/2008 Asawa et al. .............. 361/683

FOREIGN PATENT DOCUMENTS

| JP | 2002-124226 | 4/2002 |
| JP | 2002-182784 | 6/2002 |
| JP | 2003-256116 | 9/2003 |

* cited by examiner

*Primary Examiner*—Hung V Duong
(74) *Attorney, Agent, or Firm*—Finnegan, Henderson, Farabow, Garrett & Dunner, L.L.P.

(57) ABSTRACT

An information processing apparatus configured to have: a display section (2) pivotally provided with respect to an apparatus main body (3) with a pair of hinges (9a, 9b) so as to pivot between a close position to close the apparatus main body and an open position to open the apparatus main body; and an operation section (18) executing a predetermined function by being operated is disposed between the pair of hinges, so that operations to the operation section are possible in the both states of the open position and the close position of the display section.

8 Claims, 6 Drawing Sheets

INFORMATION PROCESSING APPARATUS

TECHNICAL FIELD

The present invention relates to a technical field about an information processing apparatus. More particularly, the present invention relates to a technical filed of improving usability for a user when using an information processing apparatus having a display section pivotally supported with respect to an apparatus main body of the information processing apparatus.

BACKGROUND OF THE INVENTION

Among information processing apparatuses, such as a personal computer, a PDA (Personal Digital Assistant), and a mobile telephone, there is a type in which a display section having a display screen is pivotally supported to an apparatus main body that performs predetermined processes and a plurality of operation buttons are disposed as operation sections on the apparatus main body (for example, refer to Japanese Patent Application Publication No. 2003-2561-16).

In the above-mentioned information processing apparatus, the display section is configured to be able to pivot between a close position to close the apparatus main body and an open position to open the apparatus main body.

DISCLOSURE OF THE INVENTION

Meanwhile, in recent years, functions of an information processing apparatus have become diversified. For example, an information processing apparatus may sometimes be used as a music player, for which a display section thereof is not required, in addition to the works carried out while seeing image data displayed on a screen of the display section.

However, in the above-mentioned conventional information processing apparatus, when in a state that the display section is at the close position to close the apparatus main body, every operation button provided on the apparatus main body is closed. Accordingly, operations to each operation button are limited to only for a state of the open position where the display section is opened with respect to the apparatus main body.

Accordingly, when a user uses the information processing apparatus even though in a situation that does not require the display section, the user has to open the display section once in order to operate the operation buttons, which is inconvenient for the user.

On the other hand, there also exists an information processing apparatus having operation buttons, which are used in a situation that the information processing apparatus is used without requiring a display section thereof, provided on a side surface or a front surface of its apparatus main body, that is, the one having the operation buttons disposed at positions that are not closed by the display section. In such the information processing apparatus, however, there arises a disadvantage that the operation buttons are provided at positions difficult to operate, for example, like at the side surface or the front surface of the apparatus main body.

Therefore, a task of an information processing apparatus according to the present invention is to overcome the above-mentioned problem and to improve usability for a user in regard to operations to an operation section.

In order to solve the above-mentioned problem, an information processing apparatus according to the present invention is configured to have: a display section pivotally provided with respect to an apparatus main body with a pair of hinges so as to pivot between a close position to close the apparatus main body and an open position to open the apparatus main body; and an operation section executing a predetermined function by being operated is disposed between the pair of hinges so as to allow operations to the operation section in the both states of the open position and the close position of the display section.

Therefore, the information processing apparatus according to the present invention has the operation section that is provided at the position enabling operations irrespective of the open/close position of the display section.

BEST MODE FOR CARRYING OUT THE INVENTION

In the following, the present invention will be explained with reference to accompanying drawings. The best mode described below is an example in which the present invention is applied to a personal computer. It is to be noted that a scope of application to which the present invention is applied is not limited to a personal computer, and the present invention can be applied to various information processing apparatuses, such as a PDA (Personal Digital Assistant), a network terminal, a mobile information terminal, a work station and the like.

Figure 1:
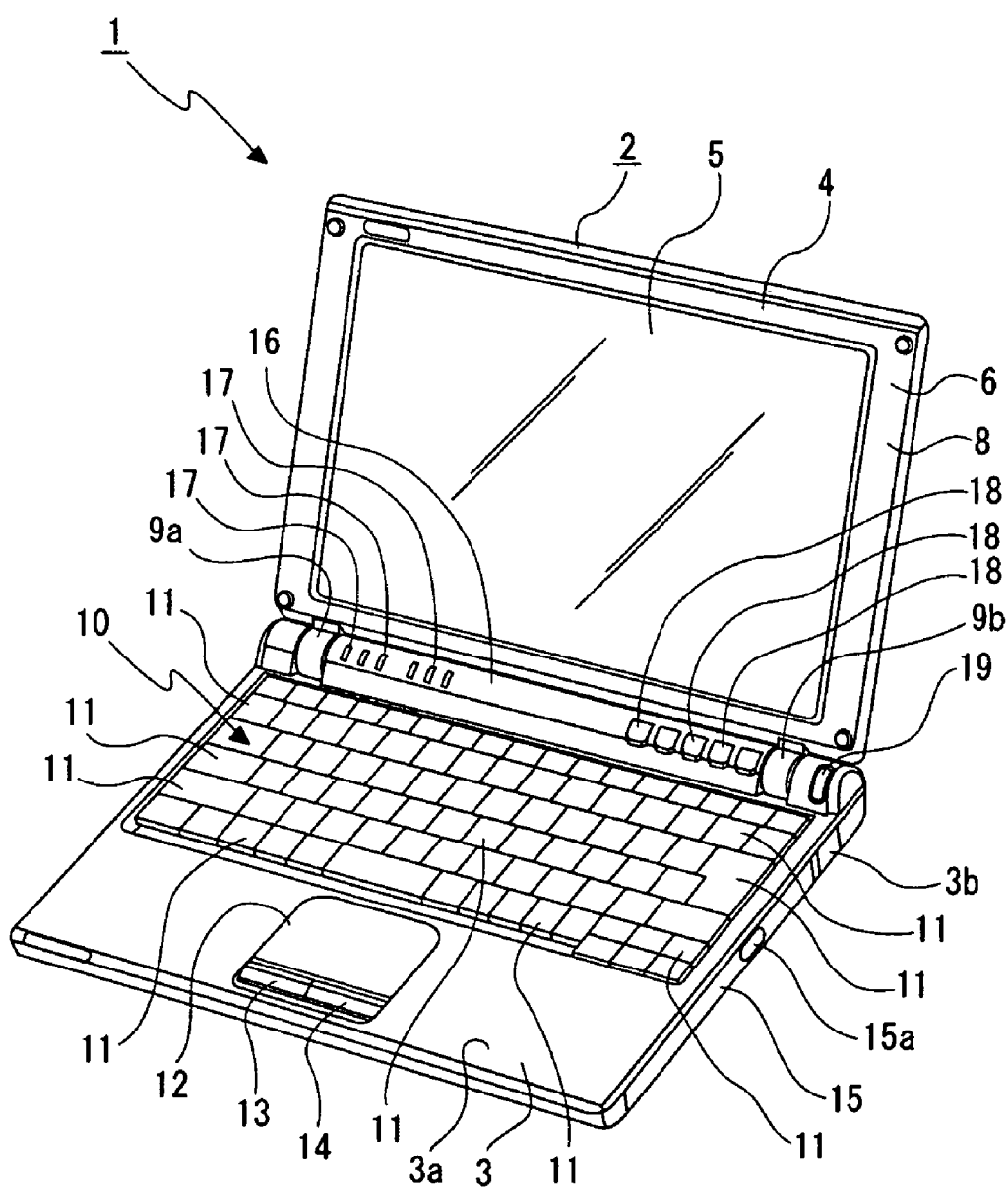
FIG. 1 shows a best mode of an information processing apparatus of the present invention together with FIG. 2 to FIG. 6 and the figure is a perspective view of the information processing apparatus showing a state that a display section is at an open position.

An information processing apparatus 1 has a display section 2 and an apparatus main body 3 (refer to FIG. 1).

The display section 2 has a display casing 4 and a display screen 5 disposed on the display casing 4. The display casing 4 is configured by coupling a front panel 6 having a substantially rectangular outer frame shape and a rear panel 7 having a substantially rectangular outer shape and formed in a shallow box shape opened toward the front panel 6, and an outer peripheral of the display casing 4 is provided as a frame 8.

The display section 2 is pivotally supported at the rear end of the apparatus main body 3 with hinges 9a and 9b provided in a horizontal axial direction. The display section 2 is able to pivot between a close position to close a keyboard, which is to be described later, of the apparatus main body 3 (refer to FIG. 2), and an open position to open the keyboard (refer to FIG. 1), and the keyboard provided on the apparatus main body 3 can be used when the display section 2 is opened.

The hinges 9a and 9b are apart from each other and provided at the positions of the left end and right end sides of the apparatus main body 3, respectively.

As shown in FIG. 1, a horizontally long shaped keyboard 10 is provided on a top surface 3a of the apparatus main body 3 except for portions of the front and back and both edges of the top surface 3a. The keyboard 10 has a plurality of predetermined operation keys 11. A processing section such as a CPU (Central Processing Unit) is provided inside the apparatus main body 3 and performs various processes in response to signals input by operation from the operation keys 11 of the keyboard 10 and the like.

A pointing device 12 is disposed on the front end of the top surface 3a of the apparatus main body 3. A pointer displayed on the display screen 5 can be moved to an arbitrary direction corresponding to an operation direction by operating the pointing device 12 to an arbitrary direction with force applied by a finger.

In front of the pointing device 12, a left button 13 and a right button 14 are disposed, which correspond to each of buttons of a mouse.

A drive cover 15 is disposed on a side surface 3b of the apparatus main body 3 and an eject button 15a is provided on the drive cover 15. A disk drive section, which is not shown, disposed inside the apparatus main body 3 is pulled out from the apparatus main body 3 together with the drive cover 15 by operating the eject button 15a.

When a disk-shaped recording medium is loaded on the disk drive section and the disk drive section is housed into the apparatus main body 3, information signals can be recorded on or reproduced from the loaded disk-shaped recording medium.

The rear end portion of the apparatus main body 3 is upwardly projected and a portion between the hinge 9a and 9b on the upwardly projected portion is provided as a battery attachment section 16. The battery attachment section 16 is opened toward the rear of the apparatus main body 3.

A plurality of indicators 17 are provided side by side at the left side of the battery attachment section 16 and a plurality of operation sections 18 are provided side by side at the right side thereof.

The indicators 17 have functions indicating, for example, a charging condition of a battery pack, a usage condition of a disk drive, an input mode condition of the operation key 11 and the like.

The operation sections 18 are, for example, operation buttons operated by pressing, and for example, buttons for executing functions relating to the disk drive section. The operation sections 18 have functions, such as a play button, a stop button, a pause button, a fast-forward button, a fast-rewind button, and volume button.

Figure 2:
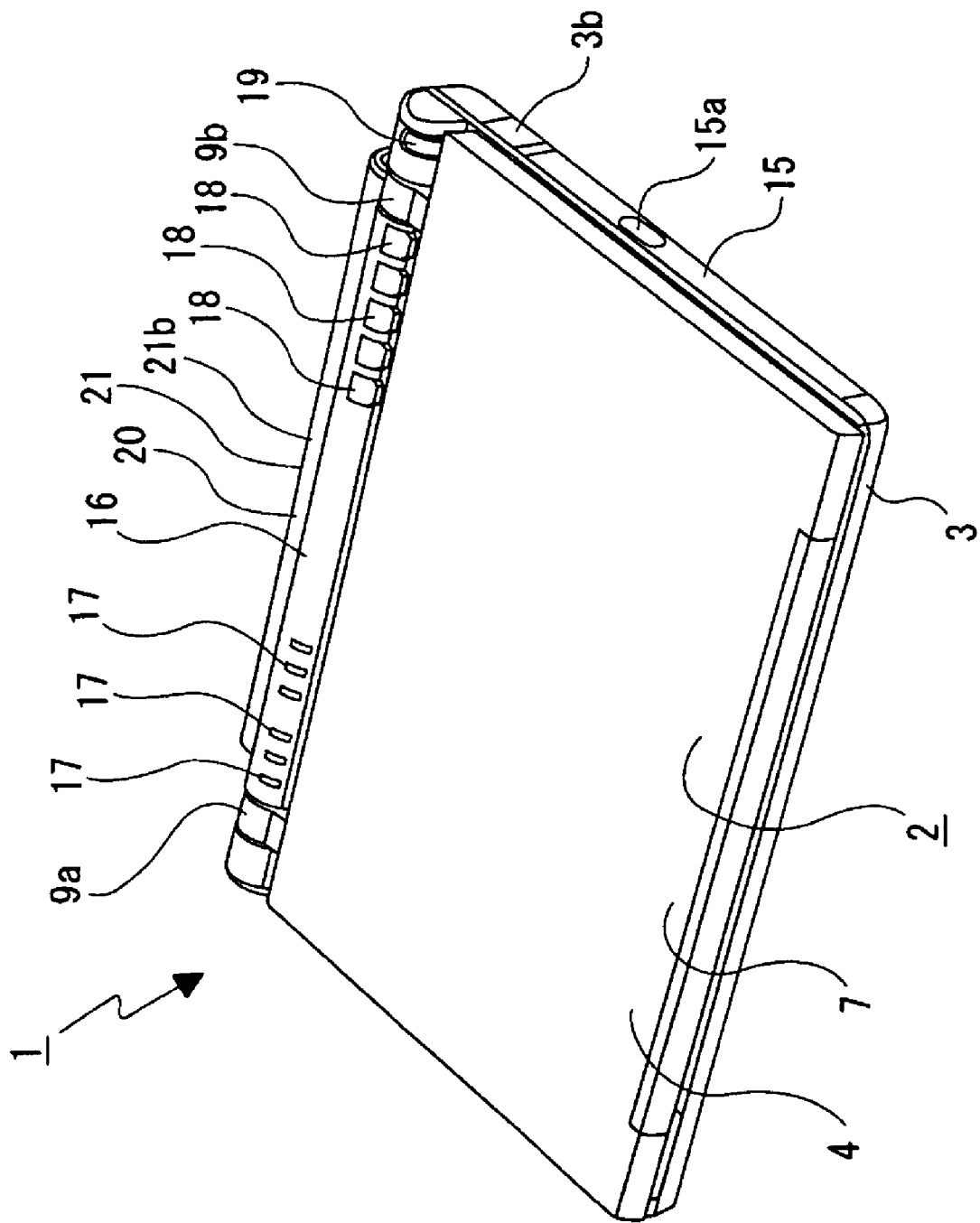
FIG. 2 is a perspective view of an information processing apparatus showing a state that a display section is at a close position.
Figure 3:
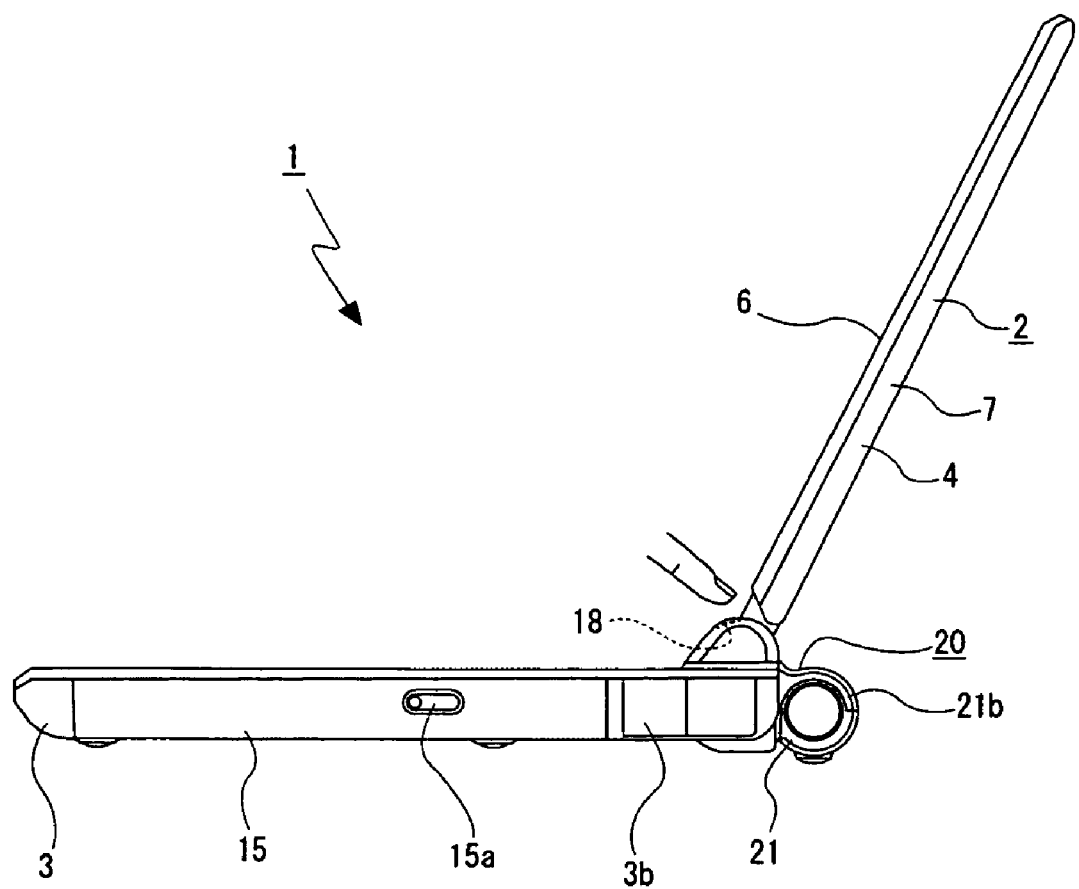
FIG. 3 is a side view of an information processing apparatus showing a state that a display section is at the open position.
Figure 4:
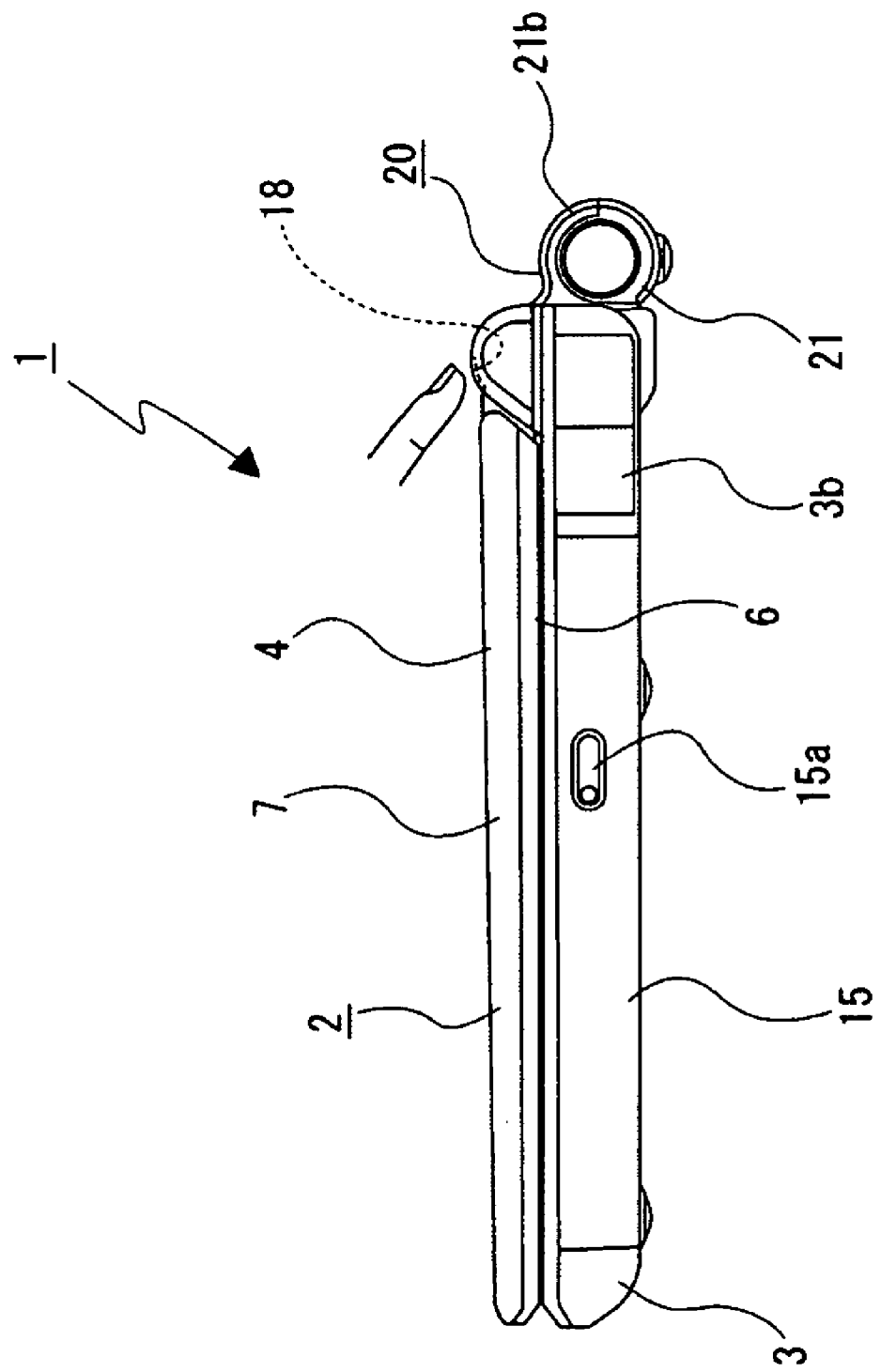
FIG. 4 is a side view of an information processing apparatus showing a state that a display section is at the close position.

The operation sections 18 are disposed on the top end side of the battery attachment section 16 (refer to FIG. 3 and FIG. 4). The operation sections 18 are positioned immediately behind the display section 2 in the close position state that the display section 2 is closed (refer to FIG. 2 and FIG. 4), and positioned immediately in front of the display section 2 in the open position state that the display section 2 is opened (refer to FIG. 1 and FIG. 3). Therefore, a user can perform operations to the operation sections 18 in both states of the close position state and the open position state of the display section 2 (refer to FIG. 3 and FIG. 4).

A power source lamp 19 is disposed at a position immediately right of the hinge 9b located on the right side of the apparatus main body 3, that is, the right side of the operation sections 18. The power source lamp 19 lights on when power is supplied to the information processing apparatus 1 and lights off when power is not supplied to the information processing apparatus 1.

In this manner, since the power source lamp 19 is positioned in the direction where the operation sections 18 are arranged on the battery attachment section 16, a user can confirm the indication of the power source lamp 19 in both states of the close position state and the open position state of the display section 2 (refer to FIG. 1 and FIG. 2).

Further, as described above, since the power source lamp 19 is disposed in the direction where the operation sections 18 are arranged, a user can confirm the power state and immediately perform operations relating to the operation section, irrespective of the open or close position of the display section 2.

Figure 5:
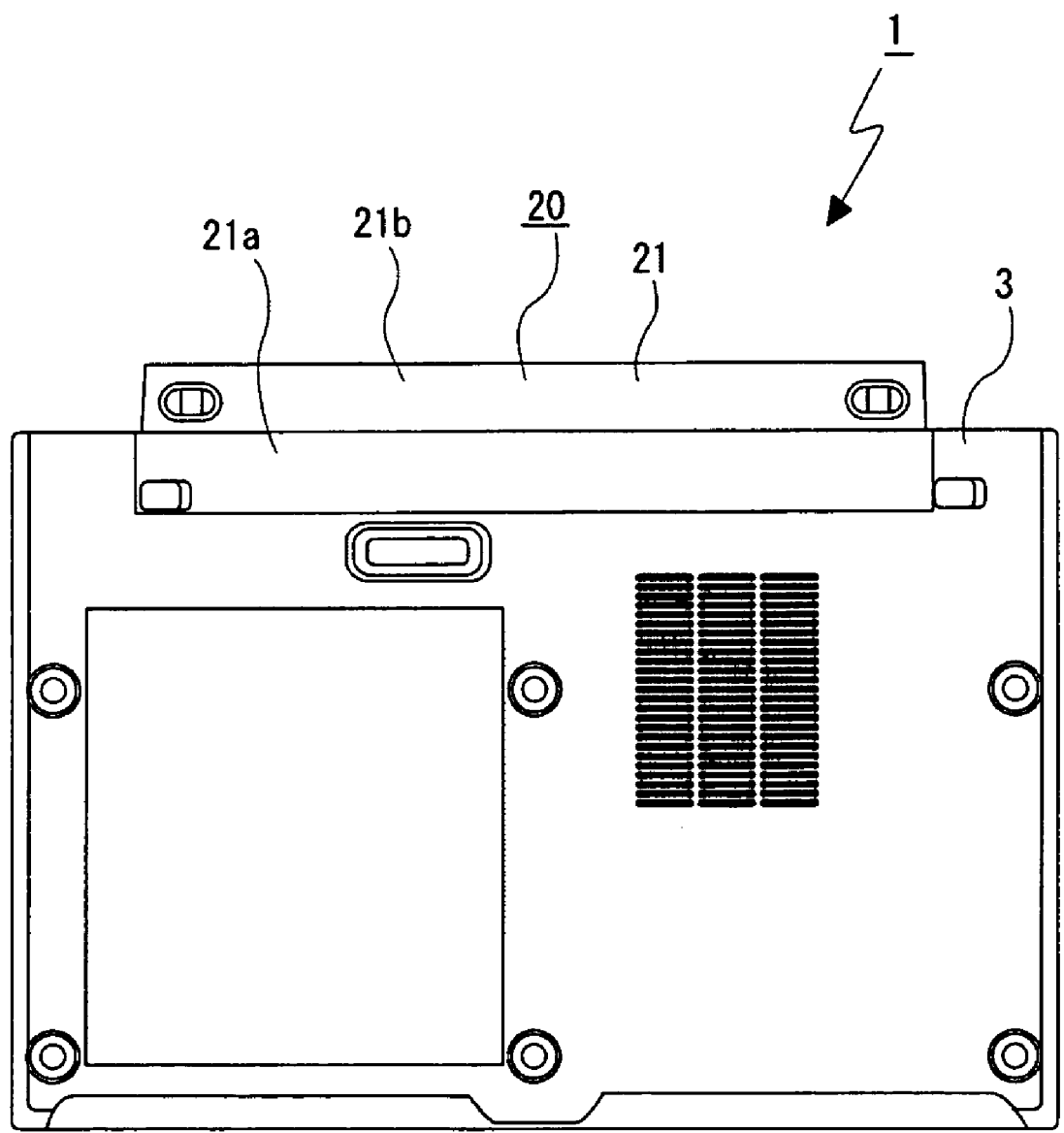
FIG. 5 is a bottom view of an information processing apparatus.
Figure 6:
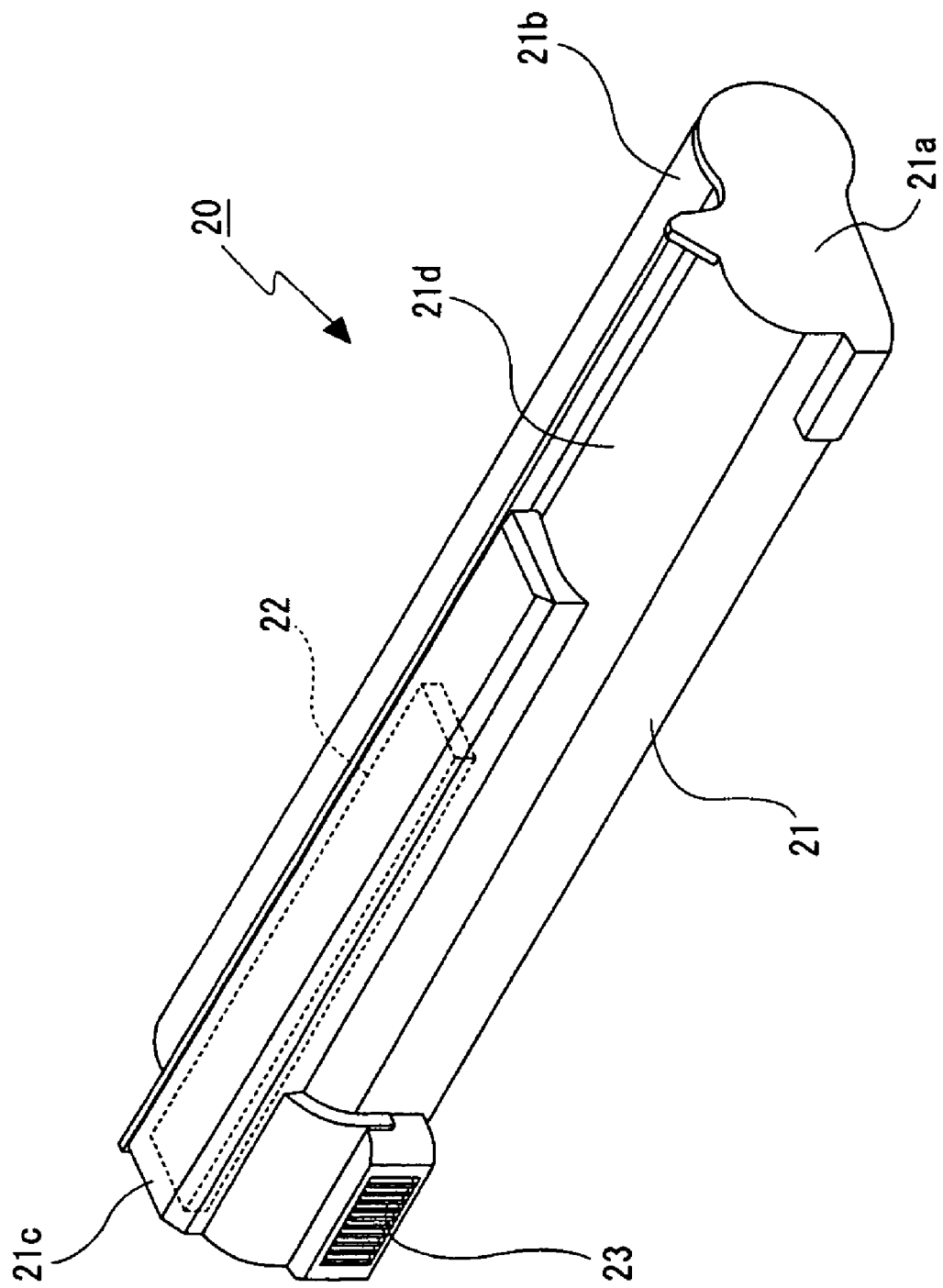
FIG. 6 is an enlarged perspective view of a battery pack.

A battery pack 20 is attached to the battery attachment section 16 of the apparatus main body 3 so as to insert from the rear of the apparatus main body 3 (refer to FIG. 3 to FIG. 5). The battery pack 20 has, as shown FIG. 6, a battery case 21, a battery (battery cell) housed in the battery case 21 and a control circuit board 22.

A connector section 23 is provided on the front surface at the left end of the battery pack 20. Under a condition that the battery pack 20 is attached to the battery attachment section 16, the connector section 23 is connected to a connecting connector provided in the apparatus main body 3.

The battery case 21 has a first battery housing section 21a positioned at the front side of the battery case 21, a second battery housing section 21b positioned at the rear side thereof, and a board placement section 21c provided so as to slightly project from the top surface of the first battery housing section 21a.

The first battery housing section 21a and the second battery housing section 21b are formed in a horizontally long shaped, and for example, three batteries (battery cell) connected in series are accommodated inside them, respectively.

The board placement section 21c is formed in a horizontally long flat shaped, and provided at the left end of the first battery housing section 21a. Accordingly, a recess section 21d is formed at the right end of the board placement section 21c on the top surface of the first battery housing section 21a.

When the battery pack 20 is attached to the battery attachment section 16, the first battery housing section 21a and the board placement section 21c are inserted into the battery attachment section 16 and the second battery housing section 21b is rearwardly projected from the apparatus main body 3 (refer to FIG. 3 to FIG. 5). At this time, a portion of the battery attachment section 16 where the operation sections 18 are arranged is disposed so as to fit the recess section 21d of the battery pack 20.

As described above, in the information processing apparatus 1, since the recess section 21d is formed on the battery pack 20 and the operation sections 18 are disposed on the recess section 21d, a space for disposing the operation sections 18 is sufficiently secured. Therefore, the operation sections 18 can be arranged at a desired position without increasing the size of the information processing apparatus 1.

Further, in most cases, a battery cell of a battery pack is generally disposed, for example, so as to partially overlap the keyboard 10 or the display section 2. However, the second battery housing section 21b into which a part of the battery cells are housed is made to rearwardly project from the apparatus main body 3 as described above, it is possible to avoid increasing the thickness of the information processing apparatus 1. As a result, it is possible to make the information processing apparatus 1 thinner.

Furthermore, by virtue of making a part of the battery pack 20 to project rearwardly from the apparatus main body 3, it is possible to make the information processing apparatus 1 thinner without reducing the number of batteries. Accordingly, it is possible not only to secure sufficient capacity of battery but also to make the information processing apparatus 1 thinner.

As described above, in the information processing apparatus 1, the operation sections 18 are disposed between the pair of hinges 9a and 9b so that operations to the operation sections 18 are possible irrespective of the open/close position of the display section 2. Accordingly, it is possible to perform operations to the operation sections 18 in the both states of the close position that the display section is closed, requiring no display section, and the open position that the display section 2 is opened, requiring the display section, thereby enabling improvement in the usability for a user.

Further, since the operation sections 18 are disposed between the pair of hinges 9a and 9b, the operation sections 18 are located at the positions easy to be operated. This is an advantage that a user can easily perform operations to the operation sections 18.

Furthermore, it is not necessary to separately provide the operation sections having the same functions for the open position and for the close position of the display section 2. Accordingly, a less space for disposing the operation section is required, thus the information processing apparatus 1 can be made compact.

It is noted that, in the above description, by way of example of the operation sections 18, there has been described the case of the operation button for executing functions relating to the disk drive section. However, an arbitrary operation section may be employed in the operation sections 18 as far as it is used irrespective of the open/close position of the display section 2, and for example, it may be an operation button for making connection to other communication apparatus wirelessly and the like.

Further, the operation sections 18 are not limited to operation buttons operated by pressing, and may be a contact-type switch such as a slide switch and a touch sensor or a contactless-type switch operated by a remote controller.

Furthermore, the position where the operation sections 18 are to be disposed is not limited to the right end side position of the battery attachment section 16, and may be a position at the central or the left end side of the battery attachment section 16, or may be positions separated at the right and left sides.

The specific shape and the structure of each of the sections shown in the above-described best mode are only examples when the present invention is implemented, and the technical scope of the present invention should not be construed to be limited by these examples.

The information processing apparatus according to the present invention is configured to have: the display section pivotally provided with respect to the apparatus main body with the pair of hinges so as to pivot between the close position to close the apparatus main body and the open position to open the apparatus main body; and the operation section executing a predetermined function by being operated is disposed between the pair of hinges, so that operations to the operation section are possible in the both states of the open position and the close position of the display section.

Accordingly, it is possible to perform operations to the operation sections in the both states of the close position that the display section is closed, requiring no display section, and the open position that the display section 2 is opened, requiring the display section, thereby enabling improvement in the usability for a user.

Further, since the operation sections are disposed between the pair of hinges, the operation sections are located at the position easy to be operated. This is an advantage that a user can easily perform operations to the operation sections.

Furthermore, it is not necessary to separately provide the operation sections having the same functions for the open position and for the close position of the display section. Accordingly, a less space for disposing the operation section is required, thus the information processing apparatus can be made compact.

The invention claimed is:

1. An information processing apparatus comprising:
   a display section for displaying an image on a display screen;
   an apparatus main body having a processing section for processing a predetermined process;
   a pair of hinges for pivotally connecting the display section with respect to the apparatus main body so as to pivot between a close position to close the apparatus main body and an open position to open the apparatus main body;
   an operation section disposed between the pair of hinges, for being operated by a user;
   a battery pack having a battery case and a battery cell housed in a battery housing case of the battery case; and
   a board placement section slightly projecting from a battery housing section of the battery pack and forming a recess section,
   wherein the operation section is arranged to fit the recess section.

2. The information processing apparatus according to claim 1, further comprising:
   a battery attachment section provided between the pair of hinges, for attaching the battery pack,
   wherein the operation section is disposed on the battery attachment section.

3. The information processing apparatus according to claim 2,
   wherein the operation section is positioned above the battery cell in the battery pack when the battery pack is attached to the battery attachment section.

4. The information processing apparatus according to claim 3,
   wherein the battery attachment section houses a part of a battery accommodating section of the battery pack between the pair of hinges.

5. The information processing apparatus according to claim 1, further comprising:
   a battery attachment section disposed between the pair of hinges, for attaching the battery pack, wherein the operation section is disposed on the battery attachment section, at a position which is above the battery attachment section and not overlapping the board placement section of the battery pack at a time of attaching the battery pack to the battery attaching section, wherein a battery cell is disposed in the battery housing section of the battery pack and a control circuit board is disposed on the board placement section.

6. The information processing apparatus according to claim 5, wherein the battery attaching section houses a part of the battery housing section of the battery pack and the board placement section between the pair of hinges.

7. The information processing apparatus according to claim 6, wherein the battery attaching section houses a part of the battery housing section of the battery pack and the board placement section between the pair of hinges.

8. The information processing apparatus according to claim 1, further comprising:

a plurality of the operation sections arranged in a direction connecting between the pair of hinges, and a power source lamp disposed in a direction of the plurality of operation sections arranged, for indicating a state of power supply.

\* \* \* \* \*